(12) United States Patent
Aitzetmueller et al.

(10) Patent No.: US 8,747,266 B2
(45) Date of Patent: Jun. 10, 2014

(54) DEVICE FOR TRANSMISSION

(75) Inventors: Heinz Aitzetmueller, St. Konrad (AT); Dieter Stoeckl, St Ulrich (AT); Gerhard Hoermann, Natternbach (AT)

(73) Assignee: VDS Getriebe GmbH, Wolforn (AT)

( * ) Notice: Subject to any disclaimer, the term of this patent is extended or adjusted under 35 U.S.C. 154(b) by 237 days.

(21) Appl. No.: 13/325,920

(22) Filed: Dec. 14, 2011

(65) Prior Publication Data
US 2012/0157254 A1 Jun. 21, 2012

(30) Foreign Application Priority Data

Dec. 16, 2010 (EP) .................................... 10195367
Jul. 22, 2011 (EP) .................................... 11175007

(51) Int. Cl.
*F16H 3/72* (2006.01)
*F16H 47/04* (2006.01)

(52) U.S. Cl.
USPC .............................................. 475/6; 475/74

(58) Field of Classification Search
CPC ..... F16H 3/72; F16H 37/065; F16H 37/0806; F16H 37/0833; F16H 47/04; F16H 2045/002; F16H 2045/005; F16H 2702/02
USPC .............................................. 475/6, 74, 295
See application file for complete search history.

(56) References Cited

U.S. PATENT DOCUMENTS

| | | | |
|---|---|---|---|
| 2,982,153 A | 5/1961 | Albertson et al. | |
| 4,491,034 A | 1/1985 | Fredriksen | |
| 5,156,577 A * | 10/1992 | Fredriksen et al. | 475/74 |
| 7,361,111 B2 | 4/2008 | Aitzetmueller et al. | |
| 8,469,850 B2 | 6/2013 | Stoeckl et al. | |
| 2003/0162619 A1* | 8/2003 | Rodeghiero et al. | 475/73 |
| 2006/0032321 A1 | 2/2006 | Aitzetmueller et al. | |
| 2007/0249455 A1* | 10/2007 | Hasegawa et al. | 475/78 |
| 2008/0155974 A1 | 7/2008 | Aitzetmueller et al. | |
| 2008/0214348 A1 | 9/2008 | Hasegawa et al. | |
| 2010/0236348 A1* | 9/2010 | Legner | 74/473.11 |
| 2011/0015022 A1 | 1/2011 | Stoeckl et al. | |
| 2011/0178686 A1* | 7/2011 | Morris | 701/51 |

FOREIGN PATENT DOCUMENTS

| | | |
|---|---|---|
| DE | 30 41 865 A1 | 6/1982 |
| EP | 1 961 994 A2 | 8/2008 |
| JP | 2008 201303 A | 9/2008 |

OTHER PUBLICATIONS

English-Language Abstract of JP 2008 201303 (A) from Espacenet, Hirai Masao, published Sep. 4, 2008.

* cited by examiner

*Primary Examiner* — Edwin A Young
(74) *Attorney, Agent, or Firm* — Tiajoloff and Kelly LLP

(57) ABSTRACT

The present invention relates to a device for a transmission, comprising a summing planetary gear set (17) and a variator unit (13) and components that bring them into operative connection with each other and with an input shaft (1) and output shaft (3, 8) for influencing the output speed in a continuously variable manner at constant input speed. The device can be installed as a prefabricated module between an internal combustion engine and a conventional transmission of any configuration and is also suitable for splitting the drive power of an internal combustion engine among a vehicle drive and one or several power take-offs, with the speed of the vehicle drive and/or the speed of the power take-off being adjustable in a continuously variable manner by the device. The device is also suitable for retrofitting existing motor vehicles.

26 Claims, 11 Drawing Sheets

Prior Art

DEVICE FOR TRANSMISSION

FIELD OF THE INVENTION

The present invention relates to a device for a transmission, comprising a summing planetary gear set and a variator unit and components that bring them into operative connection with each other and with an input shaft and output shaft for influencing the output speed in a continuously variable manner at constant input speed.

It especially concerns a transmission for installation between an internal combustion engine and a provided transmission of any configuration for the purpose of influencing the output speed in a continuously variable manner at constant input speed, which transmission is also suitable for retrofitting existing motor vehicles.

DESCRIPTION OF THE PRIOR ART

Several systems are known from the state of the art for splitting the drive power. They are usually installed between the internal combustion engine and the transmission for driving the vehicle and conduct a portion of the engine power to one or several secondary consumers such as pumps or other units. The power divider system according to Cushman, which is shown in FIG. 11 in a schematic and simplified way, shows an input shaft which is connected with the internal combustion engine, the angular momentum of which is diverted directly or via a spur gear stages to two clutches, of which one leads to the drive shaft of the vehicle and the other to the drive shaft of a unit such as a pump for example.

As is realized without any further explanations, this principle is not suitable to operate or set in a continuously variable manner the vehicle speed at high power to the power take-off shaft irrespective of the engine speed in defined, especially low, speed ranges. The speed of the output shaft in relation to the vehicle transmission is always at a defined ratio to the drive speed in the system according to Cushman. If the vehicle is to be operated at a very low speed and high engine speed, then this can only occur in that the clutch is operated in a slipping manner in relation to the vehicle transmission or is braked via the service brake in the presence of a torque converter. Alternatively, the speed of the internal combustion engine can be reduced, which also has an effect on the speed of the output shaft to the auxiliary unit, e.g. a fire pump.

Another known system for dividing the drive power which is built by the company Twin Disc is shown in FIG. 12 in a schematic and simplified way. In this system too, there is the same problem as mentioned above in that the unit power is in direct relationship to the engine speed, which on its part connected to the vehicle speed. It is also not possible in this case that the engine speed is high, so that the fire pump can be operated at high output and the vehicle is moved at the same time over a prolonged period at walking speed.

The solutions shown in the two FIGS. 11 and 12 can also be found in practice in fire trucks. They are certainly suitable for temporary activation of power take-off shafts. The relevant disadvantage lies therein that the output shaft speed can be influenced in relation to series-connected vehicle drive only by slipping clutches. This leads to the consequence however that driving the vehicle at very low speed and with high engine speeds at the same time by using series-connected automatic transmissions or synchronous power-split transmission can only occur to a very limited extent or not at all. The minimum speed is determined by the required engine speed in relation to the drive of the auxiliary units by ratio of transmission in the lowest gear and optionally by a torque converter.

Furthermore, continuously variable transmissions are known which split the torque of the drive unit among a vehicle drive and a power take-off in the manner that the vehicle drive can be changed in a continuously variable manner within a predetermined range. JP 2008 201303 A therefore discloses a special transmission concept for a continuously variable transmission tractors. This transmission cannot be integrated as a separate module between a conventional transmission and an engine and is therefore also especially not suitable for retrofitting.

DE 30 41 865 A1 and EP 1 961 994 A2 also disclose highly integrated continuously variable transmissions, which also cannot be integrated as a separate module between a conventional transmission and an engine.

The present invention is therefore based on the object of providing a device in the form of a module for continuously variable adjustment of the speed on the output shaft to the vehicle drive transmission which can be installed between an internal combustion engine and any transmission, e.g. a manual transmission, a synchronous power-split transmission or an automatic transmission.

Optionally, the device in accordance with the invention shall also allow the splitting of the drive power of an internal combustion engine to a vehicle drive and one or several power take-offs with continuously variable adjustment of the speed on the output shaft to the vehicle transmission or with continuously variable adjustment of the speed on the output shaft to the power take-off which substantially avoids the mentioned deficiencies in the known devices and comes with a simple configuration that is cost-effective in production and is also suitable for retrofitting.

The device in accordance with the invention shall especially allow driving the vehicle at high engine speed even at low travelling speed without influencing the vehicle speed only by way of slipping clutches, or setting the speed in a continuously variable way in the power take-offs independent of the engine speed in defined, especially very low, travelling speed ranges.

GENERAL OUTLINE OF THE INVENTION

Based on a device of the kind as mentioned above, this object is achieved in accordance with the invention in such a way that the device can be installed as a prefabricated module between the input shaft of an internal combustion engine and the output shaft to a conventional transmission of any kind and/or the output shaft to a power take-off, and that the device comprises means for splitting the drive power of an internal combustion engine among a vehicle drive and one or several power take-offs, with the speed of the vehicle drive and/or the speed of the power take-off being adjustable in a continuously variable manner by the device.

In accordance with the invention, a module is provided between the input shaft of an internal combustion engine and the output shaft to the vehicle drive or a power take-off, comprising a superposition transmission and a variator which enables a continuously variable reduction or increase in the angular momentum from the input shaft to the output shaft, with the angular momentum of the input shaft being transmitted via a spur-gear stage to a ring gear of the superposition transmission and from said ring gear to a planet carrier via planet wheels and a sun wheel which is in operative connection with said planet wheels and which is driven by way of a variator system, which planet carrier is in operative connection with the output shaft or the power take-off.

The module in accordance with the invention is also suitable for splitting the drive power of an internal combustion engine to a vehicle drive and one or several power take-offs, with the speed of the vehicle drive or the speed of the power take-off being adjustable in a continuously variable way. Furthermore, the module can be used between the internal combustion engine and the power take-off gear for influencing the output speed at constant input speed in a continuously variable way.

This device, which is also referred to as a "module", is suitable for example for special emergency vehicles such as fire trucks, especially airport fire trucks, but also for road sweeping machines, truck mixers, rotary snow plows or similar applications, in which the vehicle speed or the speed on the power take-offs is to be adjustable irrespective of the engine speed in defined, especially very low, speed ranges in a continuously variable manner. The present invention allows adjusting the vehicle speed and speed on the power take-offs in an optimal manner to the respectively prevailing working conditions.

In the case of motor vehicles without power take-off, the module is also suitable to increase or reduce the output in relation to the engine speed. If for example the output is increased in relation to the engine speed, then this will lead to a lower torque on the following transmission, by means of which a higher amount of power can be transmitted to the following transmission. As a result, it is now possible to combine diesel engines of newer generation with higher torques with conventional transmissions which are not configured for such high torques.

The device in accordance with the invention is especially suitable for retrofitting existing vehicles.

BRIEF DESCRIPTION OF THE DRAWINGS

The device in accordance with the invention is schematically shown in the drawings and will be explained below in closer detail by reference to the drawings, wherein.

DETAILED DESCRIPTION

The devices shown in FIGS. 1 to 10 do not claim to completely represent all possible alternatives. A further alternative embodiment is clearly obvious to the person skilled in the art from these illustrations.

Figure 1:
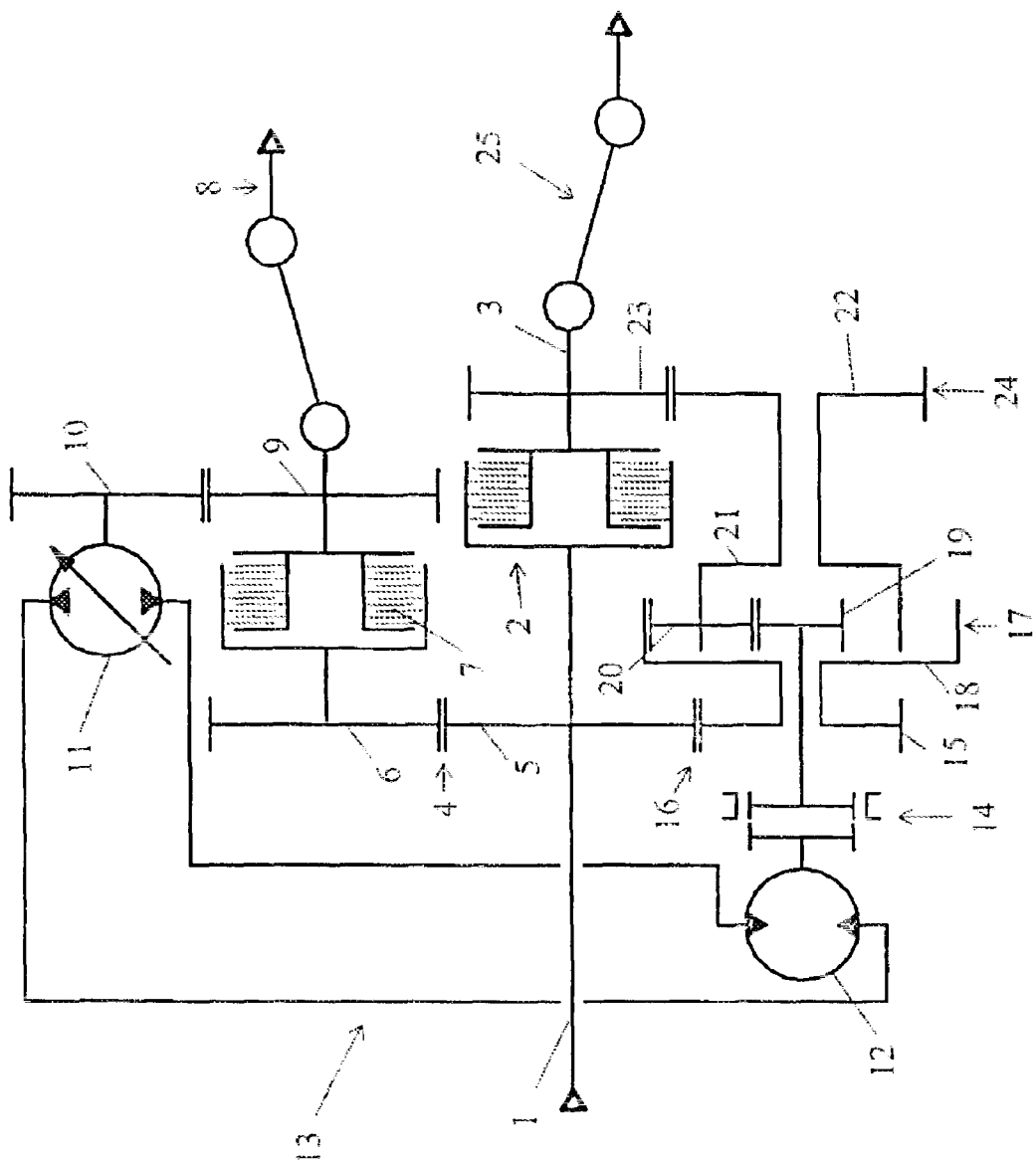
FIG. 1 shows a first embodiment of the module in accordance with the invention for a transmission for installation between an internal combustion engine and any kind of vehicle transmission.

As is shown in FIG. 1, the device in accordance with the invention for splitting the drive power of an internal combustion engine among a vehicle drive and one or several power take-offs offs comprises an input shaft 1 and an output shaft 3 to the vehicle transmission, which are connectable with each other via a synchronizing device 2. In normal driving operation, without the activation of the power take-off 8, the synchronizing device 2 is closed and the torque is transmitted from the transmission input shaft 1 directly to the output shaft 3.

As an alternative to this, the input shaft 1 is connected with the output shaft 3 to the vehicle transmission via a superposition transmission 17, with the ring gear 18 being coupled via a spur-gear stage 16 with the transmission input shaft 1 and rotating according to the speed of the transmission input shaft 1.

The sun wheel 19 of the summing planetary gear is driven by a hydraulic motor 12, which is connected in a closed circuit with a hydraulic pump 11. The hydraulic pump 11 is activated by activating the power take-off 8 by closing the clutch 7.

The output from the summing planetary gear occurs via the planet carrier 21 and from there via a spur-gear stage 24 to the output shaft 3. The speed of the output shaft 3 to the vehicle transmission can be adjusted in a continuously variable way to the respective conditions within the speed and power limits of the hydrostatic variator system 13.

FIGS. 1 to 10 show hydrostatic variator systems 13. The elaborations apply similarly to suitable alternative variator systems, in which a continuous change of the output speed of the variator system is possible. This includes all hydrostatic variators with a variable displacement pump and a fixed displacement motor or with a variable displacement pump and a variable displacement motor, e.g. in form of axial piston machines or in form of vane-type units, and also electric variators, belt or chain variators and many more.

The power take-off 8 is coupled when necessary via a selectable clutch 7 to the transmission input shaft 1 by means of which the entire torque of the transmission input shaft 1 is transmitted to the power take-off 8 if required.

In normal travelling operation of the vehicle, the power flow from the transmission input shaft 1 to the output shaft 3 and from there to the vehicle transmission is closed via the synchronizing device 2. The connection 14 of the hydraulic motor 12 with the sun wheel 19 of the summing planetary gear is opened, as also the clutch 7, so that no power is transmitted to the power take-off 8. As a result of the direct connection of the transmission input shaft 1 with the output shaft 3, the entire drive power is transmitted with minimal losses. The components of the summing planetary gear and the connected spur-gear stages rotate without load according to the selected ratios of transmission.

In combined travelling operation, the clutch 7 is also closed in addition to the closed synchronizing device 2. The connection 14 remains open. The vehicle speed is determined by the speed of the internal combustion engine and the ratio of transmission of the engaged gear in the transmission (not shown) following the output shaft 3.

If the vehicle speed is to be adjusted in combination with unchanged power transmission to the power take-off 8, the conveyed quantity of the pressure medium is influenced to such an extent in the variator system 13 in the hydraulic pump 11 by a respective control device that there is synchronous speed between the output shaft of the hydraulic motor 12 and the shaft to the sun wheel 19 at connection 14.

Once the synchronous speed has been reached, the sun wheel 19 is connected with the hydraulic motor 12 by means of the connection 14 and subsequently the direct connection between the transmission input shaft 1 and the output shaft 3 is interrupted by opening the synchronous transmission 2. From this time, the power transmission from the internal combustion engine to the vehicle transmission exclusively occurs via the superposition transmission 17, by means of which the speed of the output shaft 3 can be set in a continuously variable way via the variator system 13 by influencing the speed of the sun wheel 19.

The speed of the output shaft 3 can be adjusted in a continuously variable manner to the respective assignment conditions by a respective adjustment of the speed of the hydraulic motor 12 via the setting of the hydraulic pump 11 at constant speed of the transmission input shaft 1. This allows also moving the vehicle at creeping speed and simultaneously operating the internal combustion engine at full speed, by means of which the full power effect is enabled on the output shaft to the auxiliary unit.

This system also allows providing an overdrive function, in which the speed of the output shaft 3 is increased in relation to the speed of the transmission input shaft 1. The precondition for this is however that the power of the internal combustion engine is sufficient and the sun wheel 19 will rotate with sufficient speed in the same direction with the ring gear 18.

Figure 2:
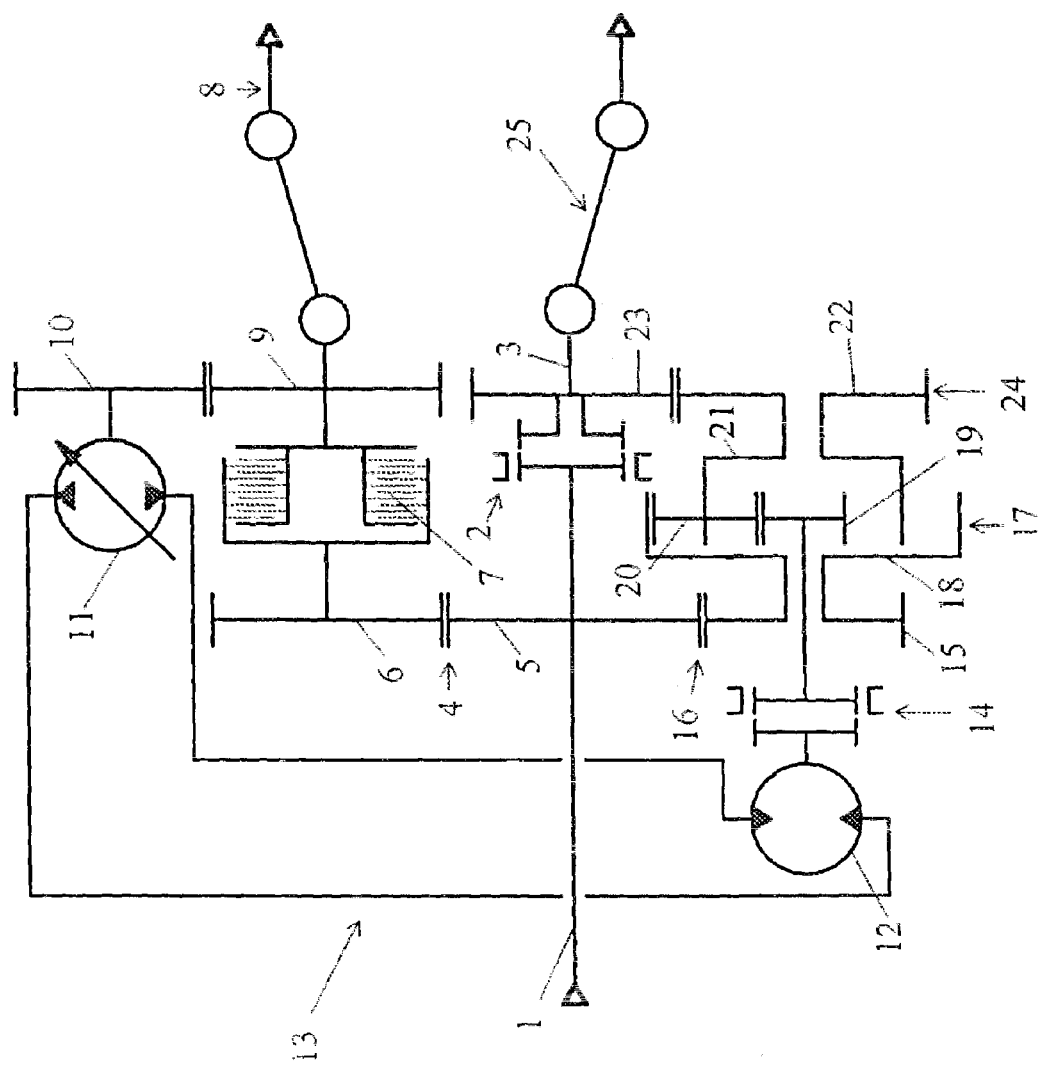
FIGS. 2 to 10 respectively show an embodiment of a module in accordance with the invention for a transmission, which module is an alternative to FIG. 1.

FIG. 2 shows an alternative embodiment. The configuration and the operating mode correspond substantially to the configuration and operating mode of the device according to FIG. 1. In this case, the synchronizing device 2 is merely replaced by a connection which is analogous to the connection 14. This embodiment is especially suitable for automatic transmissions which are provided in a series connected manner to the output shaft 3.

Figure 3:
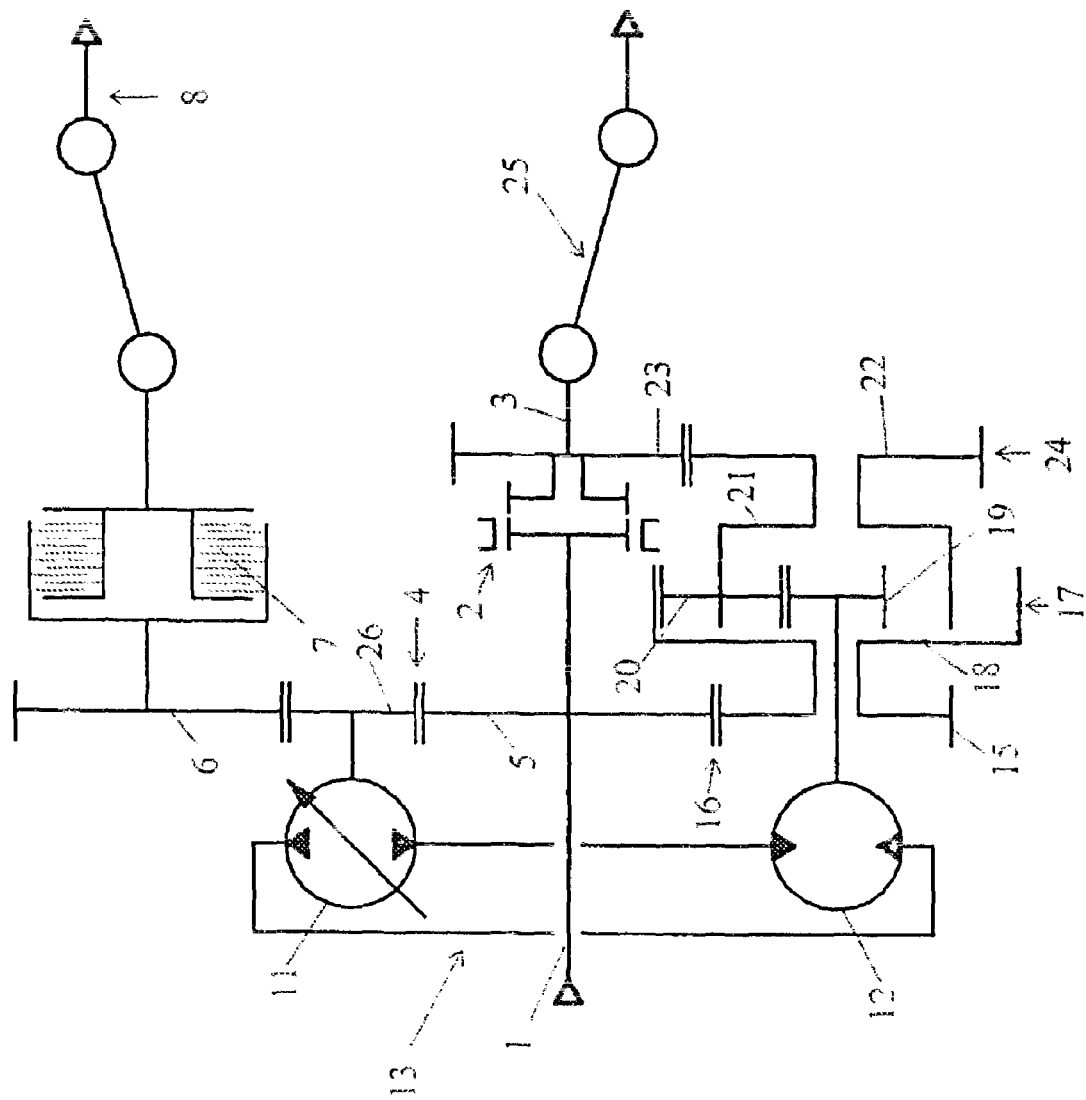

In the embodiment according to FIG. 3 there is a continuous connection of the transmission input shaft 1 to the hydraulic pump 11 and a continuous connection between the hydraulic motor 12 and the sun wheel 19. In the illustrated embodiment, the hydraulic pump is driven via an intermediate wheel 26; analogously, it can be coupled with the gear 6. In the case of a closed synchronizing device 2, the hydraulic pump is controlled in such a way that an only very low differential pressure is built up in the hydrostatic circuit. The advantage the arrangement as shown in FIG. 3 is that the output to the vehicle drive can be set independently from the speed of the drive engine, even when the power take-off was not activated.

Figure 4:
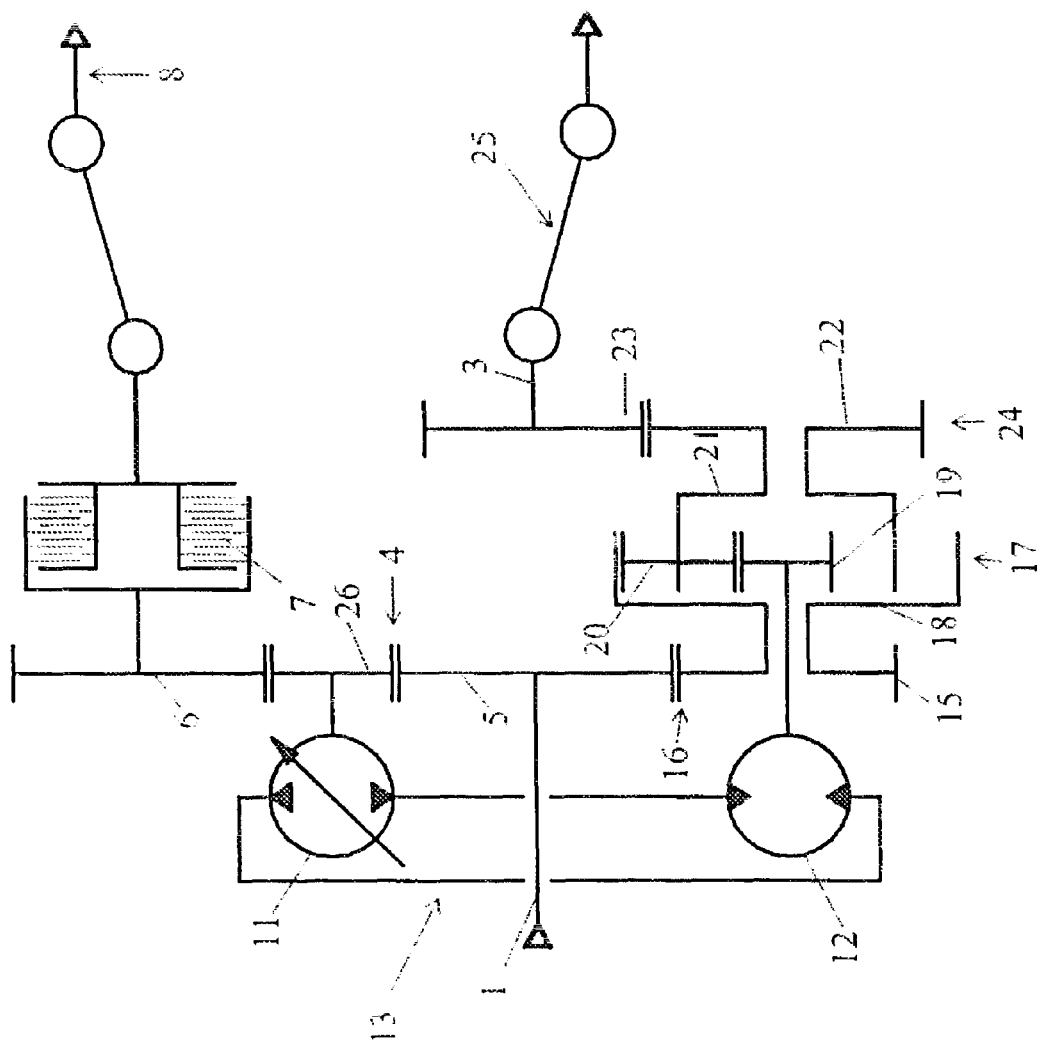

An alternative, more cost-effective embodiment in respect of the approach according to the embodiment according to FIG. 3 is shown in FIG. 4. In this case, the connection between the drive engine and the vehicle drive is always produced by the superposition transmission 17. Pressure is continuously built up via the variator 13 during the drive of the vehicle. This alternative has proven to be especially advantageous when used in vehicles with long operating times at low vehicle speeds such as road sweeping machines for example.

Figure 5:
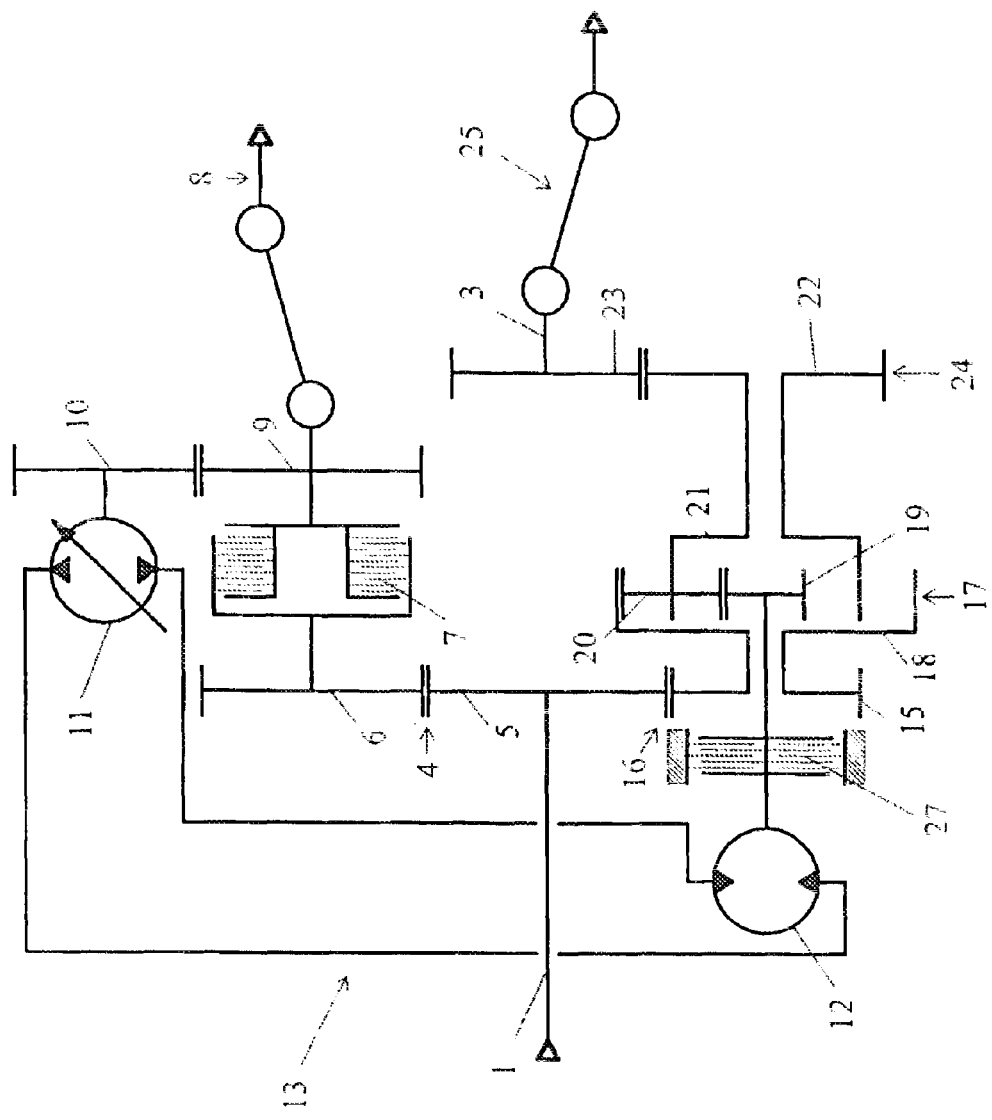

A further alternative embodiment is shown in FIG. 5. There is no direct switchable connection between the transmission input shaft 1 and the output shaft 3. In the case of a deactivated power take-off 8 to the auxiliary unit, the output occurs in a manner uninfluenced by the variator system 13 via the superposition transmission 17. The power take-off 8 will only become active when the clutch 7 is closed. Once the hydraulic pump 11 has been activated via the clutch 7, pressure is built up in the hydrostatic circuit and brake 27 will be opened. In this construction it is necessary to connect the sun wheel 19 with the transmission housing via the brake 27 when the power take-off is deactivated and to close the power flow to the vehicle drive thereby.

Figure 6:
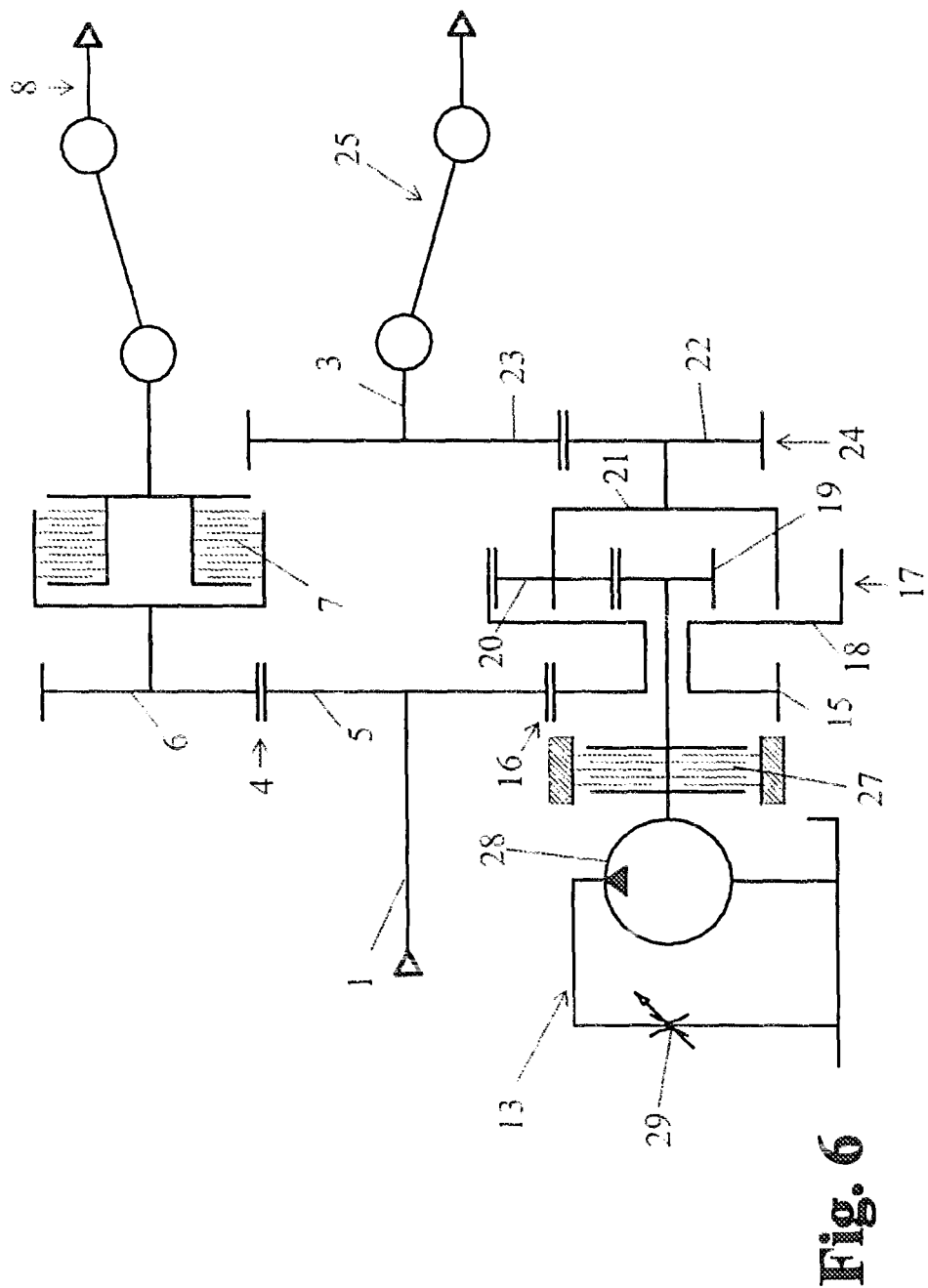

The alternative embodiment as shown in FIG. 6 shows a device in accordance with the invention, similar to the one of FIGS. 1 to 5, with the variator unit 13 being replaced by a simple pump 28 which pumps an oil flow from an oil supply towards a controllable throttle 29. The vehicle speed is influenced by the throttle control when brake 27 is opened. In this case 2, there is no directly switchable connection between the transmission input shaft 1 and the output shaft 3. If the full speed of the transmission input unit 1 is required for the vehicle drive, i.e. in the case of deactivated power take-off 8 to the auxiliary unit, the transmission of momentum to the output shaft 3 occurs directly via the planetary system 17 when brake 27 is closed.

The power take-off 8 is activated by closing the clutch 7. The vehicle speed is reduced when required by opening the brake 27. The hydraulic pump 28 which is in operative connection with the planetary gear 17 and which works against the throttle 29 is used in order to influence the speed of the output shaft 3. As a result, the speed of the vehicle will become reducible in a simpler way and over a longer operating period in comparison to a multi-disc clutch.

Figure 7:
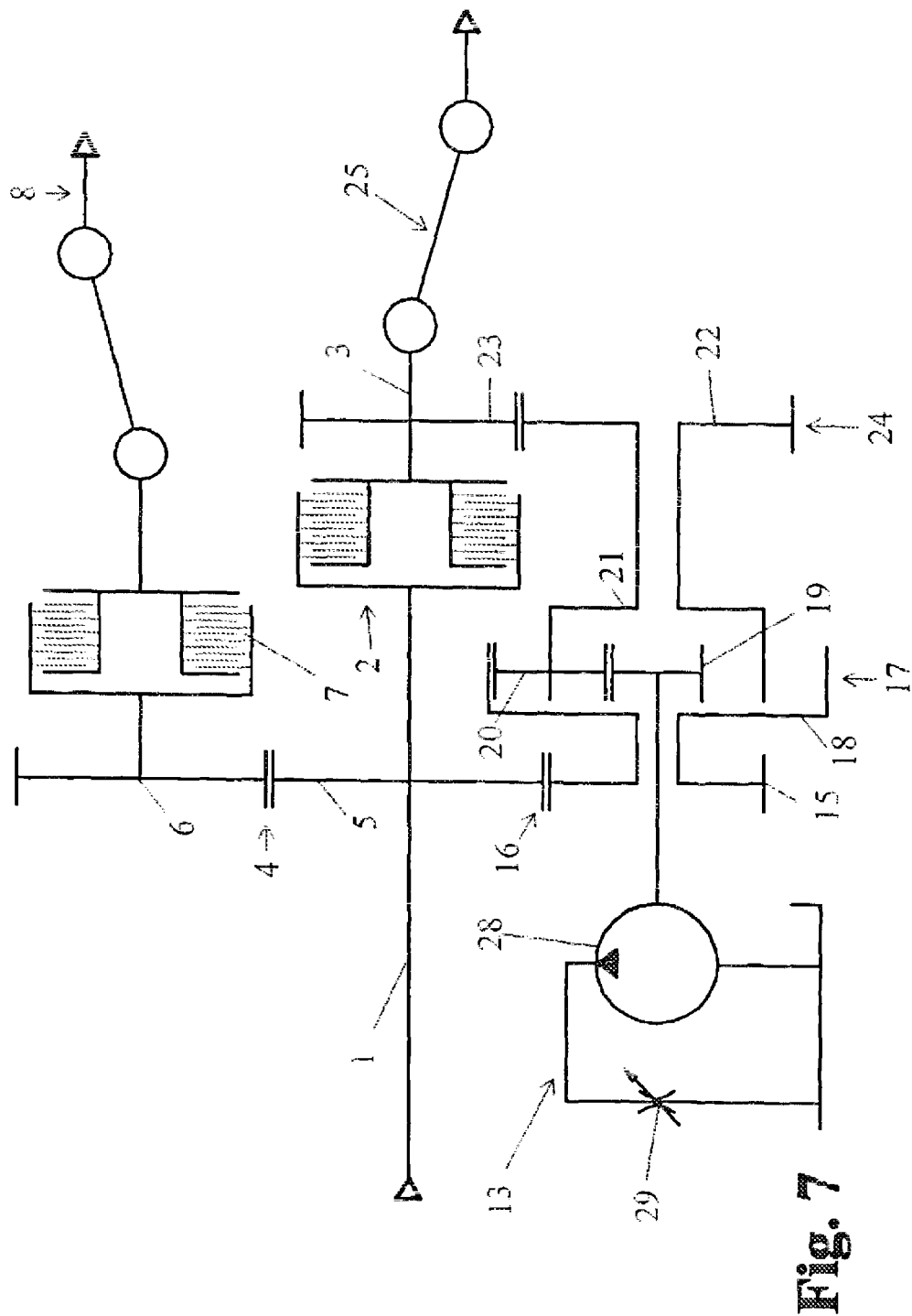

FIG. 7 shows a further alternative configuration of the device in accordance with the invention, as can typically be used for fire trucks. In this variant, the output shaft 3 to the vehicle drive is coupled during normal travel directly via the synchronizing device 2 with the transmission input shaft 1. In order to reduce the speed of the output shaft 3, the synchronizing device 2 is opened and the speed of the output shaft 3 is set by means of the speed of the sun wheel 19 in the planetary gear 17. The speed of the hydraulic pump 28 is set by controlling the flow rate on throttle 29. The ratios of transmission in the spur-gear stages 16 and 24 and in the summing planetary gear 17 are chosen in such a way that when the synchronizing device 2 is closed the speed at the sun wheel 19 and therefore at the hydraulic pump 28 is close to zero.

The embodiments shown in FIGS. 6 and 7 are especially characterized by their cost-effective construction. The use of a speed-controlled electric generator is possible as an alternative to the illustrated hydraulic pump 28.

Figure 8:
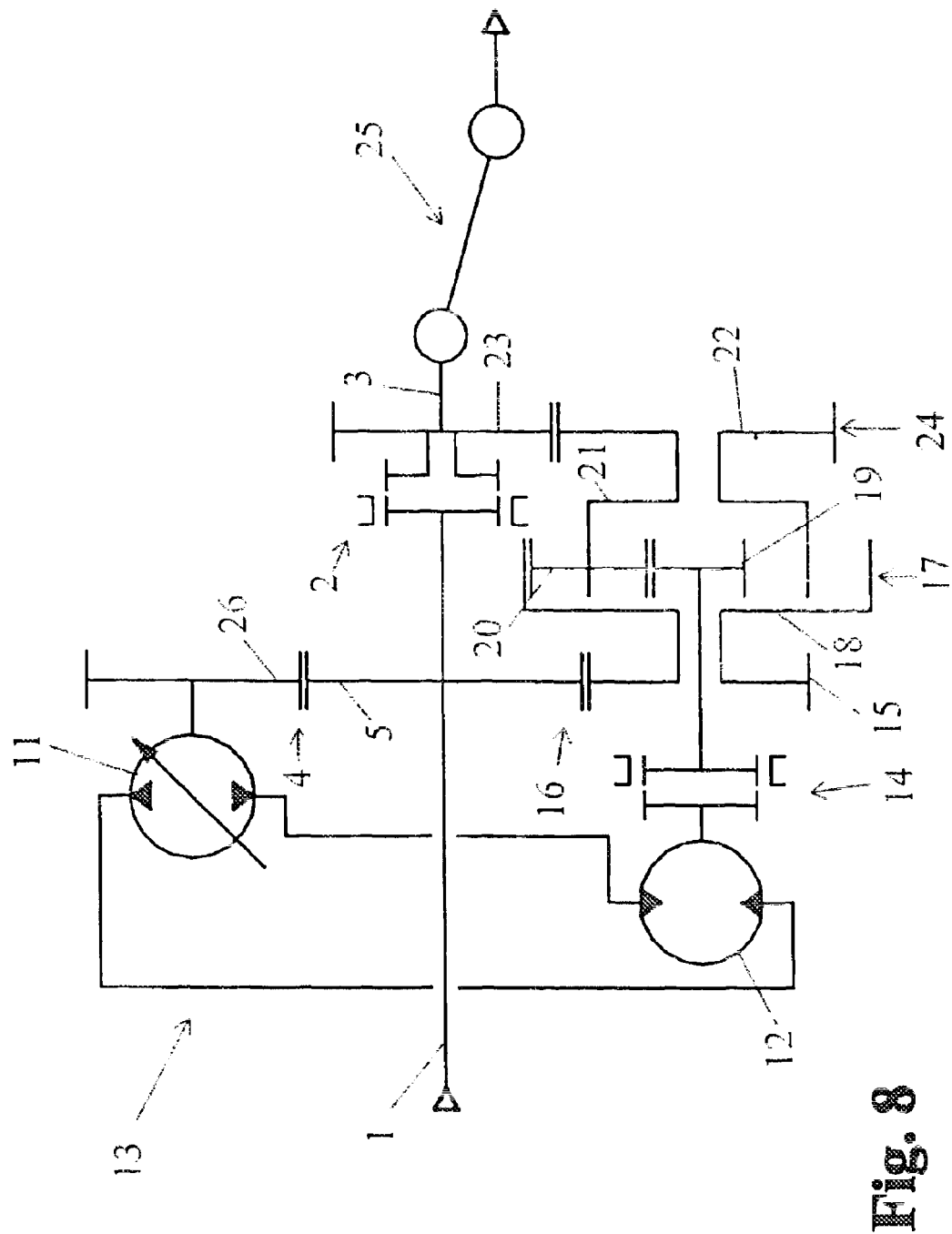
Figure 9:
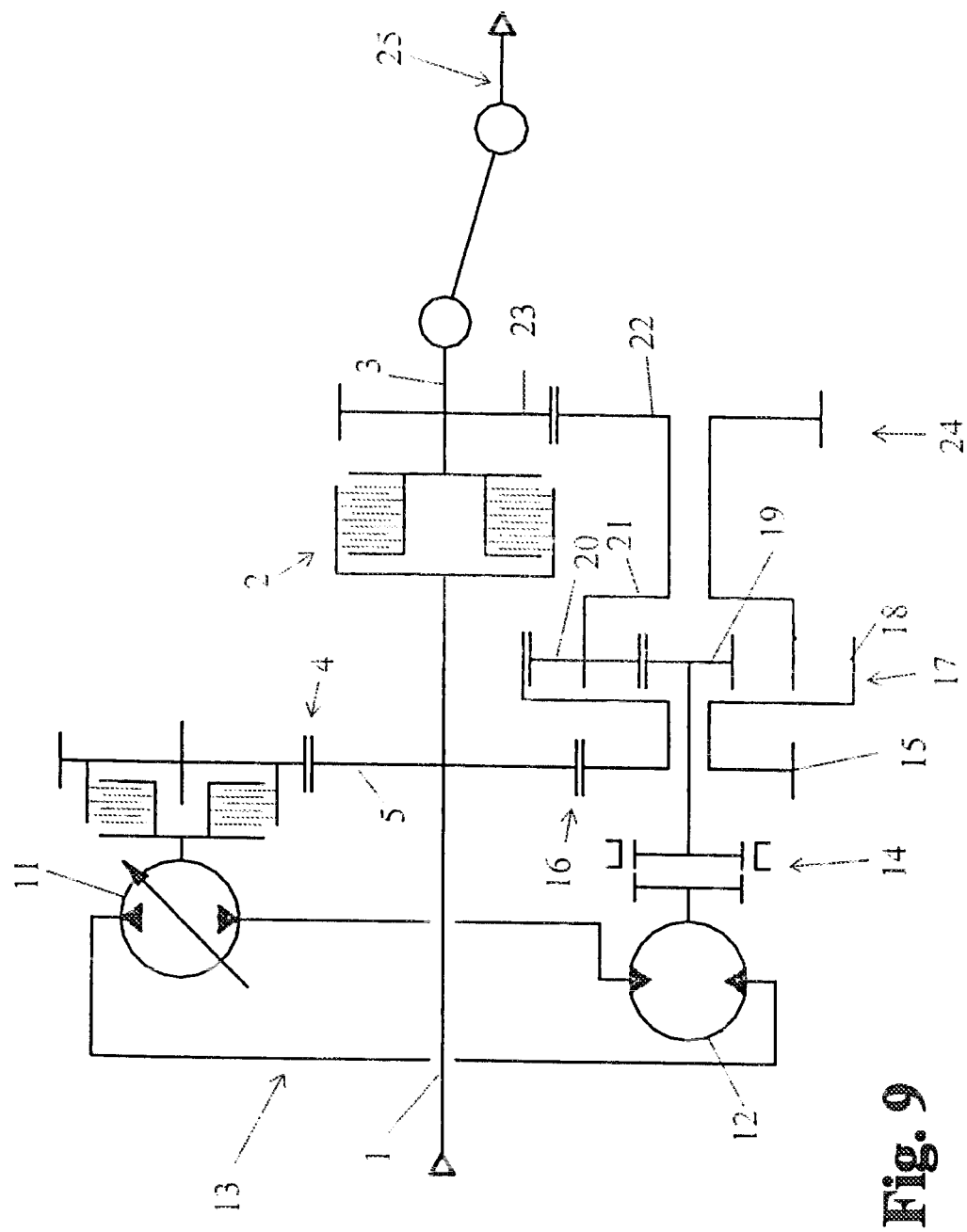

FIGS. 8 and 9 show a possible configuration of a module in accordance with the invention for a transmission in which no take-off of power is provided by a power take-off. In these embodiments, the module for adjusting the speed of the output shaft 3 in a continuously variable way at an approximately constant speed of the internal combustion engine is used in order to achieve this continuously variable adjustment within the individual gear steps.

Figure 10:
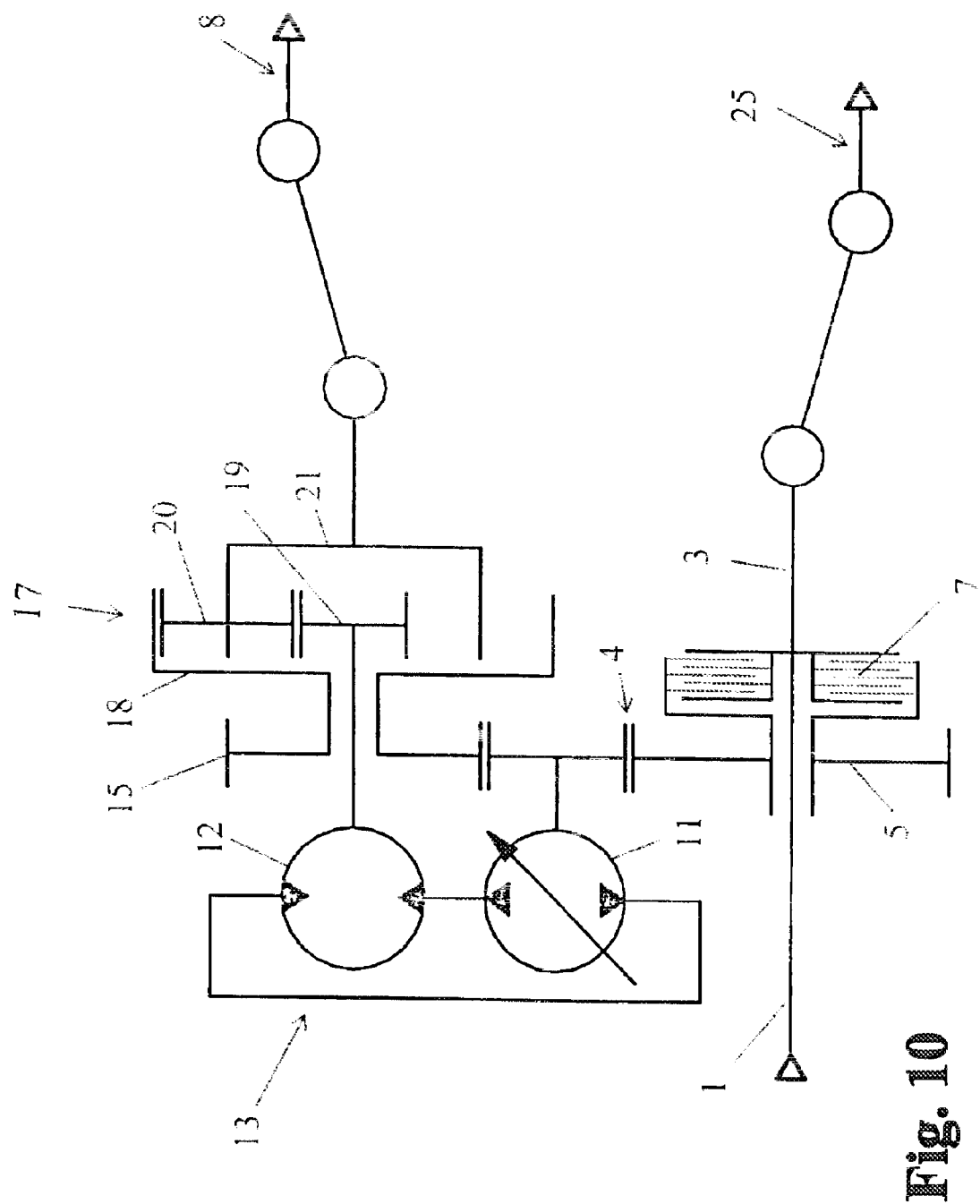
Figure 11:
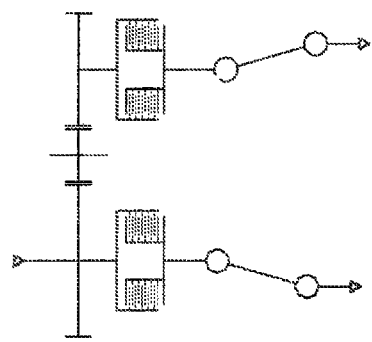
FIG. 11 shows a transmission of state of the art.
Figure 12:
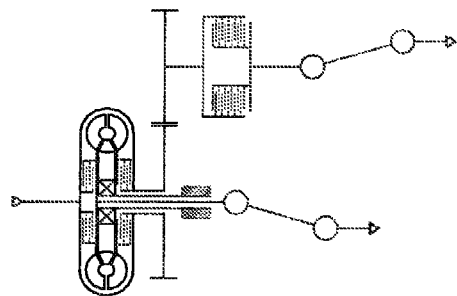
FIG. 12 shows a further transmission of the state of the art.

FIG. 10 shows a further alternative embodiment of the invention, in which only the speed of the power take-off 8 can be adjusted in a continuously variable way to the required operating conditions by using the superposition transmission 30. This alternative is advantageous if the power required at the power take-off is also to be provided at low speed of the input shaft 1. The vehicle speed is determined in this embodiment by the speed of the input shaft 1 and the selected gear step in the vehicle drive. The speed at the power take-off 8 is optimally adjusted to the respective requirements via the superposition transmission.

The advantages that can mainly be achieved with this invention are as follows:

Existing vehicle configurations can be used and transmissions and transmission components available as a standard remain in use.

When the power take-off 8 to the auxiliary unit is deactivated, the entire drive power is diverted directly to the vehicle drive.

The speed of the output shaft 3 to the vehicle drive can be adjusted in a continuously variable way to the required conditions within the speed and power limits of the variator system 13. It is thereby possible to influence the vehicle speed without any slipping clutches.

The internal combustion engine can be operated in optimal speed and/or power ranges according to the requirements of the auxiliary consumers or the power requirements in the travel drive.

The overall efficiency is very good, even when operating the vehicle drive or the drive to the auxiliary consumers via the power-split transmission by low power transmission via the variator system 13. As a result, the hydrostatic, electric or mechanical variator components can be provided with small dimensions.

The speed of the output shaft 3 can be increased over the speed of the input shaft 1, by means of which the torque at shaft 3 can be reduced at a defined input torque on the shaft 1 and higher powers can be transmitted in the series-connected transmission to the vehicle drive than in a direct connection with the internal combustion engine.

The step changes occurring in shifting processes in synchronous power-split or automatic transmissions, which inevitably produce fluctuations in the speed in the transmission input shaft, can be substantially compensated by using the superposition transmission 17 with respective control in the variator, by means of which only a very low speed variability is caused in the internal combustion engine and the internal combustion engine can be kept in optimal operating ranges during the entire acceleration or deceleration process.

The invention claimed is:

1. A device for a transmission, comprising:
   a summing planetary gear set (17) and a variator system (13) and components which bring them into operative connection with one another and with an input shaft (1) and an output shaft (3, 8) so as to influence an output speed thereof in a continuously variable manner at constant input speed,
   wherein the device is configured to be installed as a prefabricated module between the input shaft (1) of an internal combustion engine that applies drive power thereto and the output shaft (3) to a vehicle transmission and/or the output shaft to a power take-off (8), and
   wherein the device comprises means for splitting the drive power of the internal combustion engine among a vehicle drive and the power take-off, with the speed of the vehicle drive and/or the speed of the power take-off being adjustable in a continuously variable manner by the device,
   wherein the angular momentum of the input shaft (1) is transmitted via a spur-gear stage to a ring gear (18) of the summing planetary gear set (17) and from said ring gear (18) via plane wheels (20) to a planet carrier (21) which is in operative connection with the output shaft or the power take-off (8), and the speed of the output shaft (3) or the power take-off (8) is adjustable in a continuously variable manner and independent of the speed of the input shaft (1) via the variator system (13) with hydrostatic-mechanical or electric-mechanical power splitting which is in operative connection with a sun wheel (19) of the summing planetary gear set (17).

2. A device according to claim 1, wherein the variator system (13) is detachably connected via a connection (14) with the sun wheel (19) of the summing planetary gear set (17).

3. A device according to claim 1, wherein a releasable brake (27) is provided between the variator system (13) and the sun wheel (19) of the summing planetary gear set (17).

4. A device according to claim 1,
   wherein the variator system (13) comprises a hydraulic pump (11), a hydraulic motor (12) and hydraulic connections therebetween, or electric components providing equivalent functions to said hydraulic pump, motor and connections, and the variator system (13) further comprises a variator input shaft and a variator output shaft.

5. A device according to claim 1,
   wherein a hydraulic pump (28) is provided, said hydraulic pump being controllable by a controllable throttle (29), with a control position of the throttle (29) determining the speed of the output shaft (3).

6. A device according to claim 1, wherein ratios of transmission are chosen in the summing planetary gear set (17) and in the spur-gear stages (16, 24) in such a way that the changeover from direct power take-off of input shaft (1) and output shaft (3) occurs in power-splitting operation without interruption of the power transmission in synchronous points.

7. A device according to claim 1, wherein the variator system includes a hydraulic pump, wherein a synchronizing device (2) is provided between the input shaft (1) and the output shaft (3), and there is a direct power take-off from the input shaft (1) to the output shaft (3) when the synchronizing device (2) is closed, and wherein ratios of transmission are chosen in the spur-gear stages (16, 24) and in the summing planetary gear set (17) in such a way that the speed in the sun wheel (19) and in the hydraulic pump (28) is close to zero when the synchronizing device (2) is closed.

8. A device for a transmission comprising:
   a summing planetary gear set (17) and a variator system (13) and components which bring them into operative connection with one another and with an input shaft (1) and an output shaft (3, 8) so as to influence an output speed of the output shaft in a continuously variable manner at constant input speed,
   wherein the device is configured to be installed as a prefabricated module between the input shaft (1) of an internal combustion engine that applies drive power thereto and the output shaft (3) to a vehicle transmission and/or the output shaft to a power take-off (8), and
   wherein the device comprises means for splitting the drive power of the internal combustion engine among a vehicle drive and the power take-off, with the speed of the vehicle drive and/or the speed of the power take-off being adjustable in a continuously variable manner by the device,
   wherein, for splitting the drive power of the internal combustion engine among the vehicle drive and the power take-off, the input shaft (1) is connected with the power take-off (8) via one or several spur-gear stages (4) and an engaging and disengaging clutch (7), and the power take-off (8) is activated when the clutch is closed (7).

9. A device for a transmission comprising:
   a summing planetary gear set (17) and a variator system (13) and components which bring them into operative connection with one another and with an input shaft (1) and an output shaft (3, 8) so as to influence an output speed of the output shaft in a continuously variable manner at constant input speed,
   wherein the device is configured to be installed as a prefabricated module between the input shaft (1) of an internal combustion engine that applies drive power thereto and the output shaft (3) to a vehicle transmission and/or the output shaft to a power take-off (8), and
   wherein the device comprises means for splitting the drive power of the internal combustion engine among a vehicle drive and the power take-off, with the speed of the vehicle drive and/or the speed of the power take-off being adjustable in a continuously variable manner by the device, wherein a synchronizing device (2) is provided between the input shaft (1) and the output shaft (3), and there is a direct power take-off from the input shaft (1) to the output shaft (3) when the synchronizing device (2) is closed, with the summing planetary gear set (17) having components rotating according to selected ratios of transmission.

10. A device according to claim 9,
wherein the input shaft (1) conducts angular momentum via the summing planetary gear set (17) to the output shaft (3, 8) when the synchronizing device (2) is opened.

11. A device for a transmission, comprising:
a summing planetary gear set (17) and a variator system (13) and components which bring them into operative connection with one another and with an input shaft (1) and an output shaft (3, 8) so as to influence an output speed of the output shaft in a continuously variable manner at constant input speed,
wherein the device is configured to be installed as a prefabricated module between the input shaft (1) of an internal combustion engine that applies drive power thereto and the output shaft (3) to a vehicle transmission and/or the output shaft to a power take-off (8), and
wherein the device comprises means for splitting the drive power of the internal combustion engine among a vehicle drive and the power take-off, with the speed of the vehicle drive and/or the speed of the power take-off being adjustable in a continuously variable manner by the device,
wherein the variator system (13) comprises a hydraulic pump (11), a hydraulic motor (12) and hydraulic connections therebetween, and a variator input shaft and a variator output shaft; and
wherein the variator input shaft to the hydraulic pump (11) of the variator system (13) is connected via a spur-gear stage (4) with the power take-off (8) and the hydraulic pump (11) is only activated when a clutch (7) is closed.

12. A device for a transmission, comprising:
a summing planetary gear set (17) and a variator system (13) and components which bring them into operative connection with one another and with an input shaft (1) and an output shaft (3, 8) so as to influence an output speed of the output shaft in a continuously variable manner at constant input speed,
wherein the device is configured to be installed as a prefabricated module between the input shaft (1) of an internal combustion engine that applies drive power thereto and the output shaft (3) to a vehicle transmission and/or the output shaft to a power take-off (8), and
wherein the device comprises means for splitting the drive power of the internal combustion engine among a vehicle drive and the power take-off, with the speed of the vehicle drive and/or the speed of the power take-off being adjustable in a continuously variable manner by the device,
wherein the variator system (13) comprises a hydraulic pump (11), a hydraulic motor (12) and hydraulic connections therebetween, and a variator input shaft and a variator output shaft; and
wherein the variator input shaft to the hydraulic pump (11) of the variator system (13) is provided in a spur-gear stage between the input shaft (1) and a clutch (7) and is activated independently of a position of the clutch (7).

13. A device supported between an input shaft from an internal combustion engine and a first output shaft connecting to a transmission of a vehicle and a second output shaft connecting to a power take-off, said device comprising:
a summing planetary gear set;
a variator system; and
components operatively connecting the summing planetary gear set and the variator system with one another and with the input shaft and the first output shaft so that the first output shaft rotates at a first output speed that is controlled and set in a continuously variable manner when the input shaft is rotated at a constant input speed; and
wherein the device comprises means for splitting drive power of the internal combustion engine between the first output shaft to the transmission of the vehicle and the second output shaft connecting with the power take-off, wherein the first output speed of the first output shaft connecting with a vehicle drive and a second output speed of the power take-off are independently adjustable in a continuously variable manner, and
wherein the input shaft transmits angular momentum thereof via a spur-gear stage to a ring gear of the summing planetary gear set, and from said ring gear via planet wheels to a planet carrier that is operatively associated with the first or the second output shaft, and
wherein the first output speed of the first output shaft or the second output speed of the second output shaft associated with the power take-off is adjustable in a continuously variable manner independent of the speed of the input shaft by the variator system using hydrostatic-mechanical or electric-mechanical power splitting that is in operative connection with a sun wheel of the summing planetary gear set.

14. The device according to claim 13, wherein the device is a prefabricated module configured to be installed as a module between the input shaft and the first output shaft.

15. The device according to claim 13, wherein the variator system comprises a hydraulic pump, a hydraulic motor and hydraulic connections therebetween, a variator input shaft operatively associated with the hydraulic pump, and a variator output shaft operatively associated with the hydraulic motor.

16. A device supported between an input shaft from an internal combustion engine and a first output shaft connecting to a transmission of a vehicle and a second output shaft connecting to a power take-off, said device comprising:
a summing planetary gear set;
a variator system; and
components operatively connecting the summing planetary gear set and the variator system with one another and with the input shaft and the first output shaft so that the first output shaft rotates at a first output speed that is controlled and set in a continuously variable manner when the input shaft is rotated at a constant input speed; and
wherein the device comprises means for splitting drive power of the internal combustion engine between the first output shaft to the transmission of the vehicle and the second output shaft connecting with the power take-off, wherein the first output speed of the first output shaft connecting with a vehicle drive and a second output speed of the power take-off are independently adjustable in a continuously variable manner, and
wherein the input shaft is connected with the power take-off via one or several spur-gear stages and an engaging and disengaging clutch, and the power take-off is activated when the clutch is closed.

17. The device according to claim 16, wherein the device is a prefabricated module configured to be installed as a module between the input shaft and the first output shaft.

18. The device according to claim 16, wherein the variator system comprises a hydraulic pump, a hydraulic motor and hydraulic connections therebetween, a variator input shaft operatively associated with the hydraulic pump, and a variator output shaft operatively associated with the hydraulic motor.

19. A device supported between an input shaft from an internal combustion engine and a first output shaft connecting to a transmission of a vehicle and a second output shaft connecting to a power take-off, said device comprising:
- a summing planetary gear set;
- a variator system; and
- components operatively connecting the summing planetary gear set and the variator system with one another and with the input shaft and the first output shaft so that the first output shaft rotates at a first output speed that is controlled and set in a continuously variable manner when the input shaft is rotated at a constant input speed; and
- wherein the device comprises means for splitting drive power of the internal combustion engine between the first output shaft to the transmission of the vehicle and the second output shaft connecting with the power take-off, wherein the first output speed of the first output shaft connecting with a vehicle drive and a second output speed of the power take-off are independently adjustable in a continuously variable manner, and
- wherein the variator system is detachably connected with a sun wheel of the summing planetary gear set.

20. A device supported between an input shaft from an internal combustion engine and a first output shaft connecting to a transmission of a vehicle and a second output shaft connecting to a power take-off, said device comprising:
- a summing planetary gear set;
- a variator system; and
- components operatively connecting the summing planetary gear set and the variator system with one another and with the input shaft and the first output shaft so that the first output shaft rotates at a first output speed that is controlled and set in a continuously variable manner when the input shaft is rotated at a constant input speed; and
- wherein the device comprises means for splitting drive power of the internal combustion engine between the first output shaft to the transmission of the vehicle and the second output shaft connecting with the power take-off, wherein the first output speed of the first output shaft connecting with a vehicle drive and a second output speed of the power take-off are independently adjustable in a continuously variable manner, and
- wherein a releasable brake is provided between the variator system and a sun wheel of the summing planetary gear set.

21. A device supported between an input shaft from an internal combustion engine and a first output shaft connecting to a transmission of a vehicle and a second output shaft connecting to a power take-off, said device comprising:
- a summing planetary gear set;
- a variator system; and
- components operatively connecting the summing planetary gear set and the variator system with one another and with the input shaft and the first output shaft so that the first output shaft rotates at a first output speed that is controlled and set in a continuously variable manner when the input shaft is rotated at a constant input speed; and
- wherein the device comprises means for splitting drive power of the internal combustion engine between the first output shaft to the transmission of the vehicle and the second output shaft connecting with the power take-off, wherein the first output speed of the first output shaft connecting with a vehicle drive and a second output speed of the power take-off are independently adjustable in a continuously variable manner, and
- wherein a synchronizing device is provided between the input shaft and the first output shaft, and, when the synchronizing device is closed, power from the input shaft is applied directly to the output shaft.

22. The device according to claim 21, wherein angular momentum of the input shaft is conducted via the summing planetary gear set to the first or second output shaft when the synchronizing device is opened.

23. A device supported between an input shaft from an internal combustion engine and a first output shaft connecting to a transmission of a vehicle and a second output shaft connecting to a power take-off, said device comprising:
- a summing planetary gear set;
- a variator system; and
- components operatively connecting the summing planetary gear set and the variator system with one another and with the input shaft and the first output shaft so that the first output shaft rotates at a first output speed that is controlled and set in a continuously variable manner when the input shaft is rotated at a constant input speed; and
- wherein the device comprises means for splitting drive power of the internal combustion engine between the first output shaft to the transmission of the vehicle and the second output shaft connecting with the power take-off, wherein the first output speed of the first output shaft connecting with a vehicle drive and a second output speed of the power take-off are independently adjustable in a continuously variable manner, and
- wherein the variator system comprises a hydraulic pump, a hydraulic motor and hydraulic connections therebetween, a variator input shaft operatively associated with the hydraulic pump, and a variator output shaft operatively associated with the hydraulic motor; and
- wherein the variator input shaft to the hydraulic pump of the variator system is connected via a spur-gear stage and a clutch with the second output shaft, and the hydraulic pump is only activated when the clutch is closed.

24. The device according to claim 23, wherein the variator input shaft to the hydraulic pump of the variator system is provided in a spur-gear stage between the input shaft and the clutch and is activated independently of the clutch.

25. The device according to claim 23, wherein the hydraulic pump operates responsive to a controllable throttle, wherein a control position of the throttle determines the first output speed of the first output shaft.

26. The device according to claim 23, wherein the transmission has ratios that are selected in the summing planetary gear set and in the spur-gear stage such that a changeover from a direct power take-off of the input shaft and the first output shaft in power-splitting takes place without interruption of transmission of power in synchronous points.

* * * * *